May 8, 1962   J. L. QUINN ET AL   3,033,449
CODED INFORMATION READING APPARATUS
Filed Oct. 20, 1958   7 Sheets-Sheet 1

| LEVEL NO. | CHARACTER | | | | | | | | | | | | |
|---|---|---|---|---|---|---|---|---|---|---|---|---|---|
| | 1 | 2 | 3 | 4 | 5 | 6 | 7 | 8 | 9 | 0 | + | – | L |
| 1 | | | | | | | | | | | | | |
| 2 | | o | o | | | o | o | o | o | | | | |
| 3 | o | | o | | o | o | o | o | | o | | | |
| 4 | | | | o | | o | o | o | | o | o | o | |
| 5 | | | | o | o | o | o | | o | o | o | | o |
| 6 | | | | | | | | | | | | | |
| 7 | o | o | o | | | o | o | | o | | o | o | |

Fig. 4.

INVENTORS.
James L. Quinn
John E. Jones
By Carlson, Pitzner, Hubbard & Wolfe
Attys May 8, 1962 J. L. QUINN ET AL 3,033,449
CODED INFORMATION READING APPARATUS
Filed Oct. 20, 1958 7 Sheets-Sheet 2

INVENTORS.
James L. Quinn
John E. Jones
By Carlson, Pitzner, Hubbard & Wolfe

May 8, 1962   J. L. QUINN ET AL   3,033,449
CODED INFORMATION READING APPARATUS
Filed Oct. 20, 1958   7 Sheets-Sheet 3

INVENTORS.
James L. Quinn
John E. Jones
By
Carlson, Pitzner, Hubbard & Wolfe
Attys.

May 8, 1962 J. L. QUINN ET AL 3,033,449
CODED INFORMATION READING APPARATUS
Filed Oct. 20, 1958 7 Sheets-Sheet 7

INVENTORS
James L. Quinn
John E. Jones
By Carlson, Pitzner, Hubbard & Wolfe
Attys.

United States Patent Office 3,033,449
Patented May 8, 1962

3,033,449
CODED INFORMATION READING
APPARATUS
James L. Quinn, Chicago, and John E. Jones, Wilmette, Ill., assignors to Cummins-Chicago Corp., Chicago, Ill., a corporation of Illinois
Filed Oct. 20, 1958, Ser. No. 768,436
13 Claims. (Cl. 235—61.11)

This invention relates in general to data processing, and in particular to the "reading" of characters represented by coded indicia on business documents or other record mediums.

In the modernization of business practices, the arithmetical operations formerly performed by clerks mentally or with desk calculators are now being accomplished by automatic "data processors." This trend has been described as "office automation." It is useful in almost any type of commercial establishment. For example, in banks a great number of checks, deposit slips, payment coupons, and the like must be sorted or posted, and the numerical values associated with each arithmetically handled in addition or subtraction operations.

Each business transaction is represented by some record or document, such as a check. Before the information, numerical or otherwise, on that record can be processed by automatic devices, it must be translated into the "language" of the devices. Most commonly, the "language" employed is in the form of electrical signals of the type acceptable as inputs to well-known electrical computers.

In some instances, characters conventionally printed on checks or other documents are transcribed into a code language by clerks operating keyboard machines which produce uniformly coded characters on a special paper or magnetic tape. The paper or magnetic tape can then be passed through a "reader" which produces the desired electrical output signals in the language of the data processor or other business machine.

In other instances, the check or business document is originally formed as a "business machine card" with punched holes or other indicia thereon which represent by a single, predetermined code the significant characters of the document. These "business machine cards" can be fed directly through a "reader" which senses the coded indicia and creates the electrical signals to be utilized by the sorters, tabulators, calculators, or other atuomatic business machines.

The coded indicia applied to business documents or records has heretofore been illegible, and, moreover, space-consuming. Proposals have been made for representing certain characters on business documents in a legible type code which can be read not only by a visual inspection but also by special reading machines. These have been burdened by the drawbacks of consuming an undue amount of available space on each document, and of requiring elaborate apparatus and procedures for applying legible code characters in the first instance as well as for automatically reading such code characters by special apparatus.

The general aim of the present invention is to bring forth an improvement in business data processing which enables a large number of characters to be represented on and read automatically from a relatively small portion of the total area of business documents or other record mediums, and wherein the most important characters may be visibly legible.

A coordinate object of the invention is to provide reading apparatus characterized by its ability to sense and uniquely respond to character-representative information formed on a record medium in either or both of two different codes irrespective of which code is employed to represent any given character or group of characters.

Still another object of the invention is to provide a novel automatic "reader" which senses and uniquely responds to any character represented on a record medium in either a first compact, illegible binary position code, or a second visibly legible binary position code. This makes possible the application of non-critical information to a reliatively small area of a record or document, coupled with the advantage that certain critical characters coded onto each document are easily confirmed by visual inspection, yet wherein characters represented in either code may be detected by automatic processing equipment.

It is still another object to provide a dual code reader susceptible of construction by the addition of only a few structural components to an existing single code reader.

A further object of the invention is to provide apparatus which can read and respond accurately either to code lines taken one at a time or taken a plurality at a time.

Other objects and advantages will become apparent as the following description proceeds, taken in conjunction with the accompanying drawings, in which.

While the invention has been shown and will be described in some detail with reference to the particular embodiments thereof, there is no intention that it thus be limited to such detail. On the contrary, it is intended here to cover all alterations, modifications, and equivalents falling within the spirit and scope of the invention as defined by the appended claims.

TYPICAL BUSINESS DOCUMENT AND TWO CODE SYSTEMS

Figure 1:
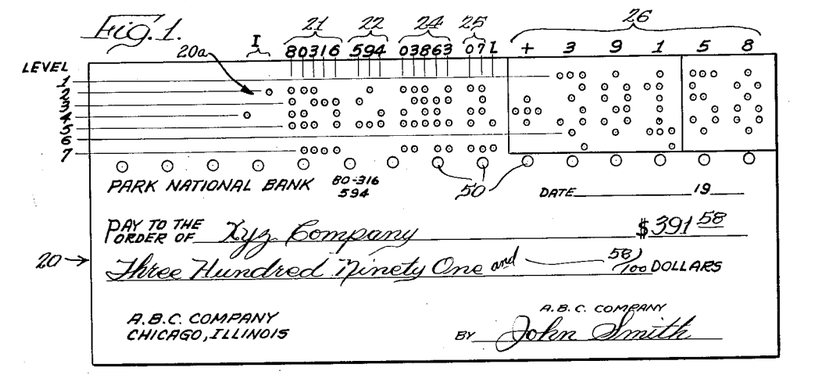
FIGURE 1 is an illustration of a typical business document having characters represented by indicia thereon in two different codes.

Referring now to FIG. 1, a record medium or business document in the form of a commercial check 20 is there shown. Insofar as the printed and written contents of the check are concerned, it is in every way conventional. When such a check is deposited by the payee, it is then the subject of several successive bookkeeping and sorting operations. The bank which receives the check from the payee for deposit must credit the latter's account in the correct amount ($391.58) and debit the same amount in its account with the Federal Reserve system or clearing house. The check is forwarded to the Federal Reserve Bank or clearing house, where the amount must be credited to the forwarding bank and debited to the account of the drawee bank. The check must be sorted and forwarded to the drawee bank.

The drawee bank must process the check by debiting the account of the drawer, crediting the account of the Federal Reserve Bank or clearing house, and by sorting the check into a group drawn by the same drawer for return to the latter.

All of these transactions involve routine manipulations of numerical data which are preferably carried out by automatic data processing apparatus. To be susceptible of direct reading into data processing apparatus, a great deal of numerical information must be represented by indicia which can be mechanically or electrically sensed.

In the present example, the upper portion 20a of the check contains indicia in the form of selectively located perforations which, according to two different codes, represent numerical characters to be read mechanically or electrically. The first number so represented is the Federal Reserve routing number having five digits corresponding to a group of five code lines 21, each containing perforations in a unique combination of vertical stations. The second such number identifies the drawee bank and has three digits represented by a group 22 of three vertically spaced perforation code lines. The third such number is the account number which identifies the drawer in the bookkeeping system maintained by the drawee bank. This number is represented by a group of five perforation code lines 24. The fourth number signifies the transaction code, that is, indicates that the transaction is a check in which the amount involved is to be debited to the drawer's account. This is represented by a group of two vertical code lines 25. All of the code lines in the groups 21–25 are arranged vertically and shown here as being serially spaced from left to right along the upper edge of the check 20. It is to be understood, however, that the particular arrangement of indicia for the different numbers can vary considerably.

The numbers represented by the code line groups 21–25 are termed "prequalifying" information. Those numbers will be the same for all checks written by a given drawee. Thus, if perforations are employed to represent these prequalifying numbers according to a given code, it is possible for a complete stack or book of checks to be prequalified simply by one operation of a conventional perforating machine which is set up to perforate the several holes at the proper locations. However, other indicia besides perforations can be employed. For example, instead of perforated holes, small black dots of ink could be employed and which would be susceptible of photoelectric sensing by virtue of the fact that they are less reflective to light than the surrounding, uninked portions of the check paper. While indicia in the form of perforations are preferred, it is to be understood that other indicia, such as ink spots, may be used in lieu thereof.

At any given station within a code field or line, a perforation is either present or absent. Thus, the coding arrangement here used is "binary" in form in the sense that any given station can have one of two states, i.e., perforated or unperforated.

The amount of the check 20 is represented by perforations applied in a second code at 26, and here shown as a pattern of perforations which makes each numerical character visibly legible. This is important because it serves as protection against the amount of the check being altered after once written, and permits the amount to be visually vertified at each step in the processing operations. These visible perforations may be applied with a check writer machine by the drawer or they may be subsequently applied by the depositor's bank, Federal Reserve bank, or the drawee bank prior to the check being put through automatic reading apparatus.

It will be observed that the numbers represented by the coded perforation lines at 21–25 have each digit represented by a single line of perforations. This is herein termed an "in-line" code, and such an arrangement permits a large quantity of numerical digits or characters to be represented in a relatively small space. On the other hand, the numerical digits represented in the area 26 are legible in form, due to the pattern of perforations employed. Each digit in this case is represented by perforations which appears at selected stations within a rectangular field, and specifically a field which has three vertical lines therein and six horizontal levels. Such a coding arrangement is herein termed a "plural-line" code where the number of lines $n$ occupied by the field for one character is in this instance equal to three.

Figure 2:
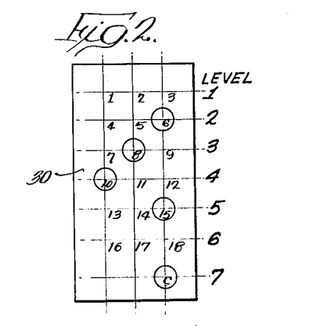
FIG. 2 illustrates the significant locations of indicia stations in the field of a plural-line, legible character code.
Figure 3:
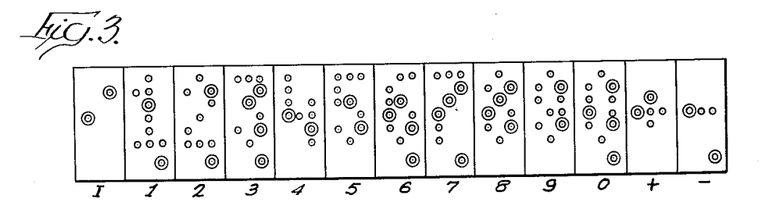
FIG. 3 shows the representation of fourteen exemplary characters in the plural-line legible code.

Referring to FIG. 2, a field 30 for one legible perforated character is there shown, comprising a rectangular matrix having perforation stations 1–18 formed by the intersections of three imaginary vertical lines and six imaginary horizontal lines. By selectively locating perforations at different combinations of these eighteen stations, any numerical or alphabetical character can be visibly represented. FIG. 3 shows the perforation patterns for the characters 0–9, I, + and —. In punching selected combinations of perforations at different ones of the eighteen stations to represent different characters, an additional perforation location is employed which may or may not be perforated according to the particular character to be represented. This perforation location is utilized for purposes of parity checking in reading apparatus, and is designated in FIG. 2 by the letter "c." It will be seen that the perforation of the checking location c is in the third vertical line of the matrix, i.e., on the right, and is located below the sixth level. Thus, the stations which may or may not receive perforations in the representation of any character are located in three vertical lines and at seven different levels (FIG. 2).

FIGURE 2, by the five small circles drawn therein, shows those particular stations which are "significant locations" in the perforation field and which will be perforated in a unique combination for each of the several characters to be represented. These significant locations are stations 6, 8, 10, 15 and c. Each of the $m$ (here, $m=5$) significant locations is at a different level, i.e., the five significant locations are at the levels 2, 3, 4, 5 and 7. There is one significant perforation location in the first and second vertical lines of the matrix field, and three such significant locations in the third line. When the numerical character "1" is perforated in a field, then perforations will be present at significant locations 8 and c (FIG. 3). In like manner, if the numerical characters "2" or "3" are perforated in a field, then perforations will appear in significant locations 6, c or 6, 8, 15, c, respectively. Inspection of FIG. 3 will reveal that each of the several characters to be represented in plural-line perforation fields will contain perforations in a unique combination of the five significant locations.

In addition to the numerical digits 0 through 9, it is contemplated in the present instance, that three other characters may be represented in plural-line perforation fields. A plus sign may be so represented, and will have perforations appearing at significant locations 8 and 10 (FIG. 3). A minus sign may also be represented, having a perforation in only one significant location, i.e., location 10. Finally, a code-identifying prefix character "I" may also be represented by perforations appearing at stations 6 and 10, both of which are significant locations.

The purpose of the prefix character "I" is to signify that following characters represented on a record medium or business document will be in an illegible code.

Figure 4:
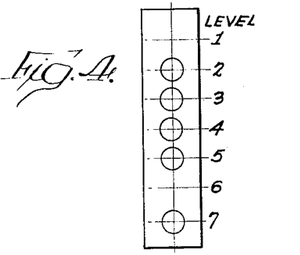
FIG. 4 illustrates the significant locations of indicia stations within a field for one character of a single-line or in-line illegible code.
Figure 5:
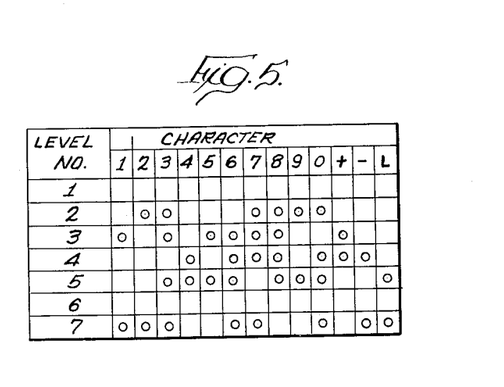
FIG. 5 is a chart illustrating the combinations of significant locations employed to represent fourteen exemplary characters according to the in-line code.

As previously indicated, certain numerical characters on the check 20 are represented by illegible, in-line coded perforations. FIGS. 4 and 5 illustrate the in-line code which is employed in the present instance. As shown in FIG. 4, each in-line perforation field consists of a single vertical row of perforation stations which preferably are located at levels 2, 3, 4, 5 and 7. Each of these perforation stations is a significant location, i.e., the presence or absence of perforations in different combinations of the $m$ levels (here $m=5$) of a single line can, according to a predetermined code, represent any one of a number of different characters. As shown in FIG. 5, the numerical character "1" is represented by perforations at levels 3 and 7 in a given line. The numerical characters "2" or "3" are represented by perforations at levels 2, 7 and 2, 3, 5, 7, respectively. The other combinations of perforation locations to represent different numerical characters will be evident from FIG. 5. Plus or minus symbols may be represented by perforations in the locations shown. Finally, a code-identifying prefix character "L" may be represented by perforations at levels 5 and 7 within one line. This prefix character is applied to a record medium just before characters which are represented thereon in a plural-line legible code; in other words, the character "L" signifies that characters following that prefix on a document are coded in a plural-line code.

In keeping with a preferred embodiment of the invention, the $m$ levels of significant locations in legible code matrices correspond to the $m$ levels of significant locations within a single-line code field. In other words, each of the significant locations in a plural-line legible code field appears at one of five different levels 2, 3, 4, 5, and 7 (FIG. 2), while each of the significant locations for an in-line code field appears at one of the same five levels (FIG. 4).

While the particular plural-line code system and the particular in-line code system described above are preferred, it will be understood that a number of different arbitrary codes may be selected and utilized without departing from the spirit and concept of the present invention. Although the significant locations of perforations for both code systems appear at $n$ levels, which here number five, this is not a vital requirement in the advantageous practice of the invention.

With an understanding of the in-line and plural-line codes employed to represent the characters on the check 20 (FIG. 1), it will be apparent that the area 20a carries indicia in the form of selectively located perforations which, reading from left to right, represent all of the significant numerical characters mentioned above. The first character is a prefix character "I," designating that the characters following to the right are coded in the illegible, in-line code. The succeeding group of five in-line code characters represent, according to the code system of FIG. 5, the Federal Reserver routing number 80316. The next group of three characters 22 represents the bank-identifying number of 594, while the following group 24 of six illegible code lines represents the drawer's account number 03863. The succeeding two lines represent a transaction code 07, which may mean that the face value of the check is to be subtracted from the balance in the drawer's account at the drawee bank.

At the end of the in-line code characters and preceding characters at 26 which are represented by a plural-line, legible code, the plural-line prefix character "L" appears (FIG. 1). This prefix character "L" signifies that the coded information which follows in the area 26 is in the plural-line code. This final group of characters represents the amount of the check +391.58.

GENERAL ORGANIZATION OF APPARATUS

Figure 6:
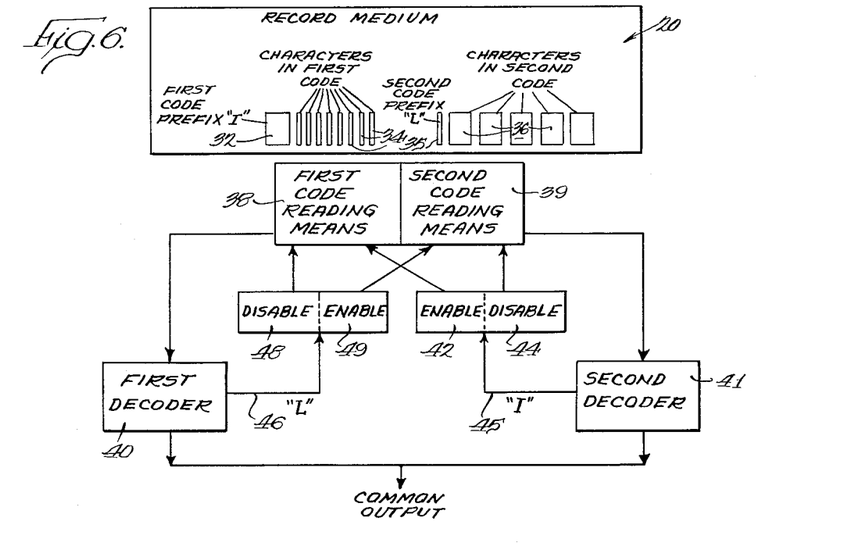
FIG. 6 is a diagrammatic block-and-line representation of a system embodying the features of the present invention.

In order to mechanically or electrically read the numerical information so represented on documents such as the check 20 (FIG. 1), a dual code reader is provided which, in accordance with the invention, is organized in the general fashion illustrated by the block-and-line diagram of FIG. 6. As there shown, the record medium or check 20 carries indicia which represent different numerical characters in two different codes. The first character appearing on the check 20 is prefix character 32 which signifies that the following group of characters 34 are represented in an in-line code system. Following the group 34, a second prefix character 35 appears which signifies that the succeeding group of characters 36 are represented in a plural-line, legible code.

To automatically "read" these numerical characters, first and second code reading means 38, 39 are employed in combination with some transport (not shown in FIG. 6) which moves the coded indicia on the record medium 20 successively past such reading means. The first reading means 38 is adapted to sense one line of indicia at a time and to respond uniquely to the indicia according to the in-line code. In other words, the means 38 will respond uniquely to perforations located in different combinations of significant locations of in-line code fields, such as the characters 34. This first reading means 38 supplies its output signals to a first decoder 40, which converts the unique response into a particular output signal for any of the several possible characters which are representable in the in-line code system.

The second code reading means 39 is adapted to sense a plurality of lines of indicia at a time and to respond uniquely to indicia present in different combinations of significant locations within a plural-line code field. It supplies its output signals to a second decoder 41 which leads to an output common with the decoder 40, and supplies and the same signal to that common output for a character represented in a plural-line code as is supplied by the first decoder 40 for a corresponding character represented in the in-line code.

The first and second code reading means 38 and 39 are susceptible of being made selectively operable or inoperable. They are complementally made operative so that when one is effective to read characters in the first code, the other does not respond at all. To make certain that the first code reading means 38 is enabled or active when characters in the first, in-line code are passing thereby, an enabling device 42 is associated with the first reading means 38 and a disabling device 44 connected to control the second reading means 39. The enable-disable devices 42, 44 receive a signal from the second decoder 41 whenever the second code reading means 39 senses a prefix character "I" which signifies that the following characters on the record medium are in the illegible code. Thus, when the indicia 32 on the record medium 20 is sensed by the second reading means 39, an output signal on a line 45 leading from the decoder 41 actuates the enabling and disabling devices 42 and 44, thereby rendering the first code reading means 38 operative and the second code reading means 39 inoperative. With this, only the first code reading means 38 responds to the group of characters 34 represented in the illegible, in-line code. The decoder 40 provides appropriate output signals to the common output which correspond to the numerical characters represented by the group 34.

When the check 20 has moved sufficiently such that the prefix character 35 is sensed by the first reading means 38, the first decoder 40 supplies an output signal on a line 46 leading to a disabling device 48 and an enabling device 49 which are respectively connected to control the first and second reading means 38 and 39. Thus, whenever the prefix character "L" is read by the reading means 38, the disabling device 48 will render the reading means 38 thereafter inoperative, while the enabling device 49 will render the second reading means 39 operative. Thus, as the plural-line code group 36 passes by the second code reading means 39, the latter will be effective to make the second decoder 41 supply appropriate response signals to the common output.

While the first and second reading means 38, 39 in FIG. 6 have been shown spaced apart and separate, they are actually substantially alined relative to the record medium or check 20, so that there is no problem of timing or time delays.

Also, in accordance with the preferred embodiments of the invention, the first and second reading means 38 and 39 may contain components which are common to both. Likewise, the first and second decoders 40, 41 may be combined into a single decoder which responds to the outputs of either the first or second reading means. This will be clarified by reference to FIGS. 7 and 8 which illustrate in detail one embodiment of the dual code reading system diagrammatically shown in FIG. 6.

FIRST EMBODIMENT

Figure 7:
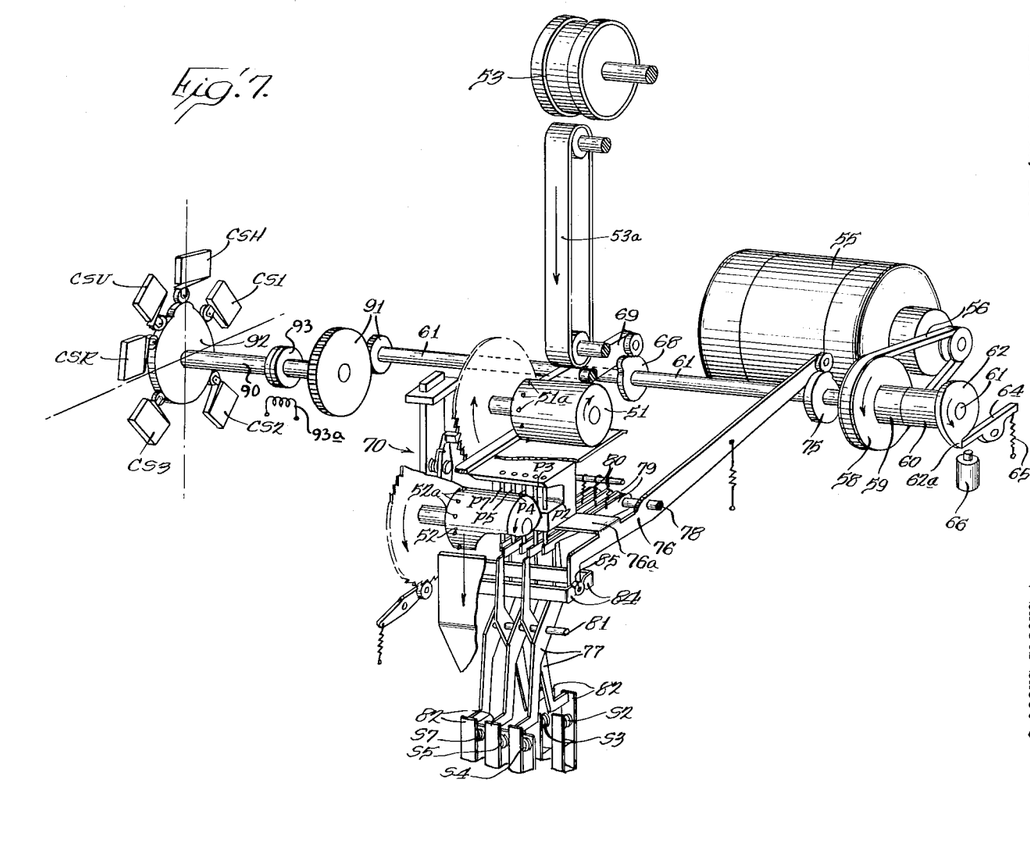
FIG. 7 is a diagrammatic perspective view of a "feeler" type dual code reader constructed in accordance with the invention to read dual codes.

Referring now to FIG. 7, a mechanical "feeler" type dual code reader is there shown which comprises means for feeding documents, such as the check 20 (FIG. 1), successively past indicia or perforation sensing means which here take the form of a plurality of feeler pins. There is one such feeler pin for each level at which significant perforation locations can occur in the two code systems previously described. Thus, there are five feeler pins P2, P3, P4, P5, and P7 which are spaced to be alined with the levels 2, 3, 4, 5 and 7 (FIGS. 2 and 4) of any line of perforations. The checks are each provided with a row of feed holes 50 (FIG. 1) which are adapted to be engaged by correspondingly spaced teeth 51a and 52a on cylindrical drums 51 and 52. These drums 51 and 52 are intermittently stepped through small angles so that checks engaged with the teeth thereon will be successively advanced past the feeler pins by distances which are equal to the width of one line of perforations. The documents are fed, one after another, down a transport belt 53a from a feed roller 53, and automatically alined and engaged with the teeth on the drums 51 and 52 by means such as that disclosed and claimed in the copending application of William H. Dreyer, Serial No. 778,773, filed December 27, 1960, a continuation-in-part of the copending application, now abandoned, of William H. Dreyer, Serial No. 768,408, filed October 20, 1958, and assigned to the assignee of the present application.

Without describing the apparatus of FIG. 7 in great detail, it is sufficient to observe that it includes a continuously running drive motor 55 connected by a belt 56 to a pulley 58 rigid with a sleeve 59. The sleeve 59 is connected by a slippable frictional coupling (not shown) to a sleeve 60 rigid with a shaft 61 carrying a cam 62. Normally a projection 62a on the cam 62 engages the tip of a pivoted stop 64 biased clockwise by a spring 65. Under these circumstances, the shaft 61 is held stationary although the pulley 58 and sleeve 59 are rotating. When a solenoid 66 is energized, it pulls the tip of the stop 64 downwardly against the bias of the spring 65, thereby freeing the cam 62 so that the shaft 61 is driven from the sleeve 59. As soon as the solenoid 66 is de-energized, the cam 62 and shaft 61 will complete a revolution and will be halted when the projection 62a engages the tip of the stop 64.

As the shaft 61 rotates through each revolution, a cam 68 thereon first rocks a lever 69 which actuates a ratchet mechanism 70 so that the two drums 51 and 52 are angularly stepped in unison by a small increment to advance a check engaged with the teeth thereof by a distance equal to the width of one perforation line. The drums 51 and 52 then dwell while the shaft 61 and cam 68 complete that revolution.

While the drums 51 and 52 are dwelling with a line of perforations in the second medium or document in registry with the feeler pins, another cam 75 on the shaft 61 rocks an operating lever 76 about a pivot rod 78, thereby raising a plate 76a which extends in overlying relation to a plurality of interposer arms 79 pivoted on the rod 78 and biased in a direction to raise their forward ends by tension springs 80.

The forward ends of the arms 79 respectively underlie the five feeler pins P2, P3, P4, P5 and P7. Normally, the plate 76a holds the forward ends of the arms 79 in a lowered position, so that there is no upward force on the feeler pins. However, whenever the operating lever 76 is momentarily permitted to rock in a clockwise direction so that the plate 76a is raised, then the springs 80 acting on the arms 79 will cause the latter to urge their respective feeler pins in an upward direction. Those ones of the pins which lie opposite perforations in the document will extend through the perforations, and thereby permit their corresponding interposer arms to raise. On the other hand, those ones of the feeler pins which do not lie opposite perforations will simply abut the document, being prevented from moving upwardly, and thus holding their corresponding interposer arms 79 in the lowered positions.

The forward ends of the arms 79 are provided with vertical latch surfaces normally engaged by the upper ends of a corresponding plurality of relay levers 77 pivoted on a rod 81. The lower ends of the relay levers 77 are respectively engaged with leaf spring members 82 which bias the upper ends of such relay levers inwardly toward blocking arms 84. The blocking arms are normally held separated by a cam 85 carried on the forward end of the operating lever 76. When the lever 76 is rocked clockwise by the cam 75, the cam 85 is raised from between the blocking members 84, and the latter can move inwardly toward one another. Those ones of the relay levers 77 which are associated with interposer arms that are raised, clear the latch surfaces on such interposer arms and pivot about the shaft 81 under the biasing influence of the leaf springs 82. On the other hand, those ones of the relay levers 80 which are associated with interposer arms 79 which are not raised (due to the fact that the associated feeler pins fail to find a perforation hole in the overlying document), are prevented from moving inwardly by engagement with the latch surfaces on the interposer arms.

Each of the leaf springs 82 carries an electrical contact, disposed opposite a mating contact on a stationary member. The blocking members 84 and the latch surfaces of the interposer arms normally hold these contacts separated or open. When any combination of the relay levers 77 are permitted to rock about the rod 81, then the corresponding electrical contacts will be momentarily closed.

The several pairs of movable and stationary contacts constitute five normally open electrical switches S2, S3, S4, S5 and S7. These correspond respectively to the feeler pins P2, P3, P4, P5 and P7. Whenever any combination of holes at different levels within one line of perforations is sensed by upward movement of the corresponding combination of the feeler pins, then the corresponding combination of the switches will be momentarily closed.

Prior to the completion of each revolution of the shaft 61, the cam 75 returns the lever 76 to its original position, so that the cam 85 again separates the blocking members 84, which in turn restore the relay levers 77 and the leaf spring members 82 to their original conditions. Also, the plate 76a is lowered to depress all of the interposer arms 79, so that the feeler pins also drop free of the document which overlies them.

On the succeeding revolution of the shaft 61, the document will be again advanced a slight amount by the ratchet mechanism 70 to bring the next line or row of perforation holes into registry with the feeler pins, and the operations above-described will be repeated. In this manner, the feeler pins sense the presence or absence of a perforation in each significant location of each line of coded perforations, and correspondingly actuate the switches S2, S3, S4, S5 and S7.

For a purpose to be made clear below, a shaft 90 is drivingly connected to the shaft 61 through gears 91 which provide a 4:1 reduction ratio, and through an electric clutch 93 when an associated clutch coil 93a is energized to engage that cluch. The shaft 90 will make one revolution for every four revolutions of the shaft 61 or, in other words, for every four incremental feeding movements imparted by the drums 51, 52 to documents being read. Rigid with the shaft 90 is a cam 92 operatively associated with a plurality of cam switches mounted therearound. The cam 92 is so shaped and disposed relative to the stationary switches, that a first cam switch CS1 will be actuated for a considerable time interval during a first revolution of the shaft 61. Similarly, cam switches CS2 and CS3 will be actuated for considerable time intervals during second and third revolutions of the shaft 61. As the shaft 61 executes a fourth revolution, the cam 92 will first actuate a reading cam switch CSR, then actuate an unsealing cam switch CSU, and return to the home position where it actuates a home switch CSH. This cycle of actuation of the five cam switches shown in FIG. 7 will be repeated for every four succeeding revolutions of the shaft 61.

Figure 8:
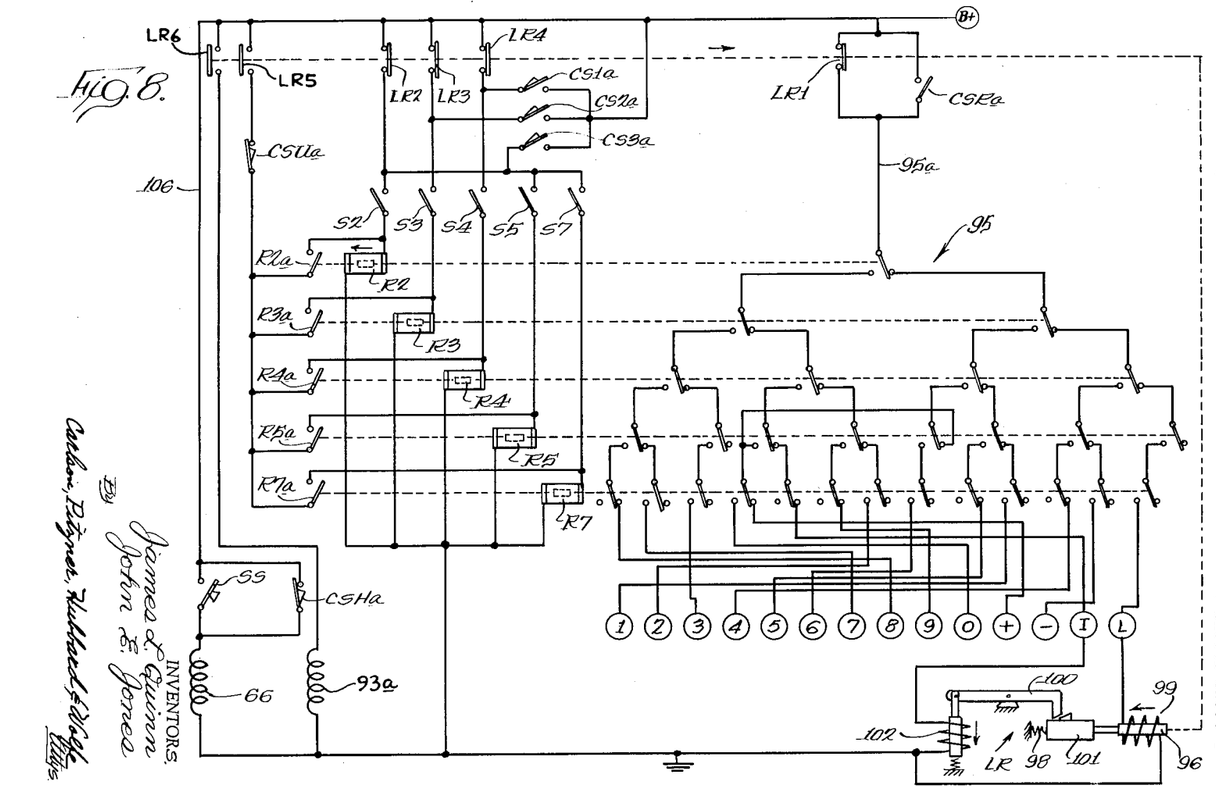
FIG. 8 is a schematic wiring diagram of electrical components associated with the reader in FIG. 7.

Referring now to FIG. 8, the electric circuit components associated with the apparatus of FIG. 7 are there shown. Consider for the moment that a latching relay LR is in the normal or unlatched condition, and its contacts LR1—LR6 are in the normal states illustrated. The apparatus and circuit components are thus placed in a condition to constitute the first reading means 38 and first decoding means 40 of FIG. 6 in an operative condition, and with the second reading means 39 and second decoding means 41 of FIG. 6 inoperative. Under these circumstances, the normally open switches S2, S3, S4, S5 and S7 are all permanently connected to one terminal of a voltage source, here conventionally represented by the symbol B+, through normally closed latching relay contacts LR2, LR3, LR4. The five switches lead to five bi-state devices here shown as relays having coils R2, R3, R4, R5 and R7 connected also to the other terminal of the voltage source, here conventionally shown as ground.

The five relays all control the actuation of groups of normally open and normally closed contacts arranged in a "whiffle tree" decoding matrix 95, as shown. This matrix has its single input line 95a connected to the B+ terminal through the normally closed latching relay contacts LR1. It has, further, fourteen output terminals which, as labeled, correspond to the characters 0–9, +, —, I and L. Whenever the relays R2–R4 and R7 are simultaneously energized in a particular combination, one and only one of these fourteen output terminals will be connected through the matrix 95 to the B+ terminal and receive a relatively high potential or output signal.

For example, if the relays R3 and R7 are both energized, a complete conduction path through the matrix from the input line 95a will be established only to the output terminal for the character "1," signifying that this numerical character has been read from a record medium. In like manner, it will be seen that if the relays R2, R3, R5 and R7 are all simultaneously actuated, then only one complete conduction path will be established through the decoding matrix 95 to the output terminal corresponding to the numerical character "3." Without describing the connections and operations of the decoding matrix 95 in greater detail, since they will be apparent from inspection, it may be noted that whenever the five relays which correspond to levels 2, 3, 4, 5 and 7 in the code chart of FIG. 5 are actuated in the various combinations there illustrated, the particular output terminal corresponding to the character so represented by the code will receive an output signal.

*Operation In Reading In-Line Code Characters.*—The operation of the present dual code reader with the first reading means and decoding means rendered operative may now be summarized. Assume that a document such as the check 20 of FIG. 1 is being fed through the apparatus of FIG. 7 and that one of the in-line code fields has been placed in registry with the sensing means or feeler pins P2–P5 and P7. As those ones of feeler pins which lie opposite perforations holes are raised in the manner previously described, then corresponding ones of the five switches S2–S5 and S7 will be momentarily closed. With this, a corresponding combination of the five relays R2–R5 and R7 (FIG. 8) will be momentarily and simultaneously actuated. Accordingly, the relay contacts within the decoding matrix 95 will be placed in a condition which will result in connection of the B+ terminal to that particular one of the several output terminals which corresponds to the numerical character represented by the row of code perforations which has been sensed.

If the row of coded perforations represents the character 5," then it will contain perforations at levels 3 and 5 (FIG. 5). Acccordingly, the feeler pins P3 and P5 will be raised momentarily, and the switches S3 and S5 will be momentarily and simultaneously closed. As shown in FIG. 8, this will result in momentary and simultaneous actuation of two of the relays R3 and R5, conditioning the contacts within the decoding matrix 95 such that a circuit is completed between the B+ terminal and the output terminal which corresponds to the character "5." If the check 20 shown in FIG. 1 with the specific coded characters applied thereto is fed through the apparatus of FIG. 7, the output terminals 80316, 594, 03863, and 07 will be successively placed at high potential, constituting a "reading" of those numerical characters. The output signals which appear on the output terminals may be fed directly to business machines such as sorters, tabulators, or computers as the controlling or input signals therefor. Since this procedure is well known in the art, it will not be further detailed.

The latching relay LR (FIG. 8) and its associated contacts correspond collectively to the enabling and disabling devices 42, 44 and 48, 49 diagrammatically represented in FIG. 6. As here shown, the latching relay includes a movable armature 96 biased to the right by a compression spring 98 and associated with a latching coil 99. Momentary energization of the coil 99 shifts the armature 96 to the left, and a latching finger 100 will engage a latch member 101 to hold the armature in that position. Associated with the latching finger is an unlatching coil 102 having its armature connected to raise the latching finger 100 when that coil is energized. Thus, if the coil 102 is momentarily energized after the armature 96 has been latched, the armature 96 returns to its unlatched position under the influence of the biasing spring 98. The armature 96, as schematically shown, is physically connected to control the contacts LR1–LR6. When the armature is in its unlatched position, contacts will be in the positions illustrated. When the armature is latched, the contacts LR1–LR4 open, and the contacts LR5 and LR6 close. Such latching relays are, per se, well known in the art and may take a variety of specific structural forms.

If at any time in the reading of in-line coded characters, as described above, the reading means senses coded indicia which represents the prefix character "L," the latching coil 99, connected from the output terminal "L" to ground, will be energized. This will result in latching of the armature 96, causing the contacts LR1–LR4 to be opened, and the contacts LR5 and LR6 to be closed.

The apparatus has now been converted or conditioned so that the switches S2–S5 and S7, and the relays R2–R5 and R7 constitute the enabled second code reading means 39, and so that the same decoding matrix 95 now constitutes the second decoder 41, of FIG. 6.

Closure of the contacts LR6 energizes the clutch coil 93a (FIG. 8) so that the cam 92 will be driven through one-quarter revolution for each revolution of the shaft 61.

With the latching relay contacts LR2–LR4 open, the sensing switches S2–S5 and S7 are not always connected directly to the B+ terminal. They are selectively connected to that B+ terminal when the normally open contacts CS1a, CS2a, CS3a of the corresponding cam switches CS1, CS2, and CS3 (FIG. 7) are actuated. For example, if the switch S2 is actuated and closed, a circuit will be completed to energize the corresponding relay R2 only if at that time the normally open cam switch contacts CS3a are closed. And because the cam switches CS1–CS3 are successively actuated as the shaft 61 (FIG. 7) executes three successive revolutions and three successive code lines are sensed by the feeler pins, these switches constitute means for selectively rendering operative different ones of the sensing switches S2–S5 and S7 as successive lines of a plural-line code are sensed.

For the purpose of storing information sensed successively from individual lines of a plural-line code character, each of the relays R2–R5 and R7 is provided with normally open sealing contacts R2a–R5a, R7a connected to a common line 106 which leads to the B+ terminal through normally closed contacts CSUa of the unsealing cam switch CSU and the latching relay contacts LR5. These sealing contacts R2a–R5a, R7a can have no effect so long as the contacts LR5 are open; their respective relays will be energized and picked up only while their corresponding sensing switches are closed. However, with the contacts LR5 closed, then each time that one of the relays R2–R5, R7 is momentarily picked up by completion of a circuit through its corresponding sensing switch, then its sealing contacts will be closed and a holding circuit will be established through such contacts from the B+ terminal.

As shown in FIG. 8, normally open contacts CSRa of the cam switch CSR are connected in parallel with the latching relay contacts LR1. Thus, when the latter contacts are open, the input line 95a for the decoding matrix 95 is disconnected from the B+ terminal except during those time periods when the contacts CSRa are closed. In this manner, the decoding matrix 95 is rendered ineffective or inoperative, and is only momentarily made operative upon closure of the contacts CSRa when reading of stored information is to take place.

Also as shown in FIG. 8, the normally closed contacts CSHa are connected in parallel with a manual start-stop switch SS which controls the energization of the reader clutch coil 66. This assures that even if the switch SS should be opened to stop the reading apparatus while the reading of a plural-line code character is in progress, the clutch coil 66 will remain energized through the contacts CSHa until all lines of that character have been read and the cam 92 (FIG. 7) returned to that position at which the home switch CSH is actuated. This assures that each cycle of reading operation will always start with the cam 92 properly phased and so that the cam switches will be operated by the cam 92 in proper sequence as the shaft 61 executes four successive revolutions. The clutch 93, which is engaged only when the latching relay contacts LR6 are closed, serves to leave the cam 92 in the "home" position when in-line code characters are being read. This assures that the cam switches CS1, CS2 and CS3 are successively actuated during the reading of the first, second and third lines of a plural-line code character.

*Operation in Reading Plural-Line Code Characters.*—The operation of the dual code reader to read characters represented by the plural-line, legible code of FIGS. 2 and 3 may now be summarized. Each legible character is made up of three vertical lines of perforations, and each such character is separated from the next by a space or a line which contains no perforations (FIG. 1).

As the first line of a plural-line code character is brought into registry with the sensing pins P2–P5, P7 (FIG. 7) it is necessary to determine only whether or not a perforation exists at the fourth level of that line, since that is the only significant location in the first line (FIG. 2). If perforations exist at other levels of the first line, this is not important to the reading of a plural-line code character. It is not desirable for any of the relays R2, R3, R5, R7 to be energized in response to sensing of perforations at levels 2, 3, 5 or 7 in the first line.

This is here accomplished by the cam switch contacts CS1a (FIG. 8) which are momentarily closed during the sensing of the first line of a plural-line code character, and thus makes it possible for the relay R4 to be momentarily energized only if a perforation is present at station 10 in the perforation field. If that perforation is present, then the relay R4 will be picked up and sealed in through its own contacts R4a.

As the shaft 61 (FIG. 7) executes a second revolution so that the second line of perforations in the plural-line code character are brought into registry with the feeler pins (FIG. 7), only the cam switch contacts CS2a (FIG. 8) will be closed. Thus, only the switch S3 is connected to the B+ terminal. Regardless of the levels at which perforations occur in the second line, the only relay which can possibly be energized in response to sensing of that line is the relay R3, and this will occur only if a perforation exists at level 3, i.e. station 8, in the rectangular matrix (FIG. 2). If a perforation does exist in the significant station 8, then the relay R3 will be momentarily energized and sealed in through its own contacts R3a.

As the shaft 61 (FIG. 7) executes a third revolution to bring the third line of a plural-line code character into registry with the feeler pins, the switch CS3a (FIG. 8) will be closed to connect the feeler switches S2, S5 and S7 to the B+ terminal. Thus, if the feeler pins detect the presence of perforations at levels 2, 5 or 7 in the third line of a plural-line code character, the relays R2, R5 or R7 will be energized and sealed in.

With this, all of the significant locations in a field for a plural-line code character have been sensed, and the relays R2–R5, R7 energized and sealed in to store information as to whether or not perforations exist at the significant locations 6, 8, 10, 15 and c. During the time that the relays are being selectively picked up and sealed in, the matrix 95 is disabled because its input line 95a is disconnected from the B+ terminal.

As the shaft 61 (FIG. 7) executes a fourth revolution, and thereby advances the document or check a distance equal to the spacing between two plural-line characters, the cam 92 (FIG. 7) first actuates the cam switch CSR, and then actuates the cam switch CSU. This causes initial closing of contact CSRa (FIG. 8) so that decoding matrix 95 is rendered effective, and a particular one of the several matrix output terminals momentarily receives a high potential signal, depending upon the particular combination of the five relays which are actuated, and upon the character which was represented by the plural-line code sensed. Then, the normally closed contacts CSUa open, unsealing those ones of the five relays which had previously been picked up. With this, the apparatus of FIGS. 7 and 8 is returned to its original condition and is ready to read the succeeding three lines and space which constitute the next plural-line code character.

By way of example, if the numerical character "8" is represented by a plural-line code on a document, then as the first line is read, a perforation will be sensed in the fourth level, i.e., significant location number 10 (FIGS. 2 and 3). Accordingly, the relay R4 will be picked up and sealed in. As the second line is read, a perforation will be sensed at the third level (station number 8, FIG. 2), so that the relay R3 will be picked up and sealed in. As the third line of the plural-line code is read, perforations will be sensed at levels 2 and 5 (stations 6 and 15) so that relays R2 and R5 will be picked up and sealed in. The relay R7 will not be energized because no perforations exist at the seventh level of the third line. With the relays so actuated, when the reading cam swtich contacts CSRa close, a circuit will be established from the B+ terminal through the decoding matrix 95 to the output terminal for the character "8," placing that latter output terminal at a high potential.

If a prefix code for the character "I" is sensed, the decoding matrix will provide an output signal on the terminal "I." This latter terminal is connected to ground through the unlatching coil 102, so that the latching relay LR will be restored to its unlatched condition, and the dual code reading apparatus conditioned for reading in-line code characters. The clutch 93 is disengaged, leaving the cam 92 in its "home" position.

When no document is disposed opposite the sensing pins P2–P5, P7, and the shaft 61 (FIG. 7) is rotating, all of the switches S2–S5, S7 will be closed. Also, when a portion of a document with no perforations at all overlies the sensing pins, none of the switches S2–S5, S7 will close as the shaft 61 rotates. This is not objectionable, however, since the decoding matrix 95 can produce no output signal when none or when all of the relays R2–R5, R7 are simultaneously actuated.

Upon comparison of FIG. 6 with FIGS. 7 and 8 it will be apparent that a number of structural components are employed in common in both the first and second reading means 38 and 39 and the first and second decoding means 40 and 41 to perform two separate functions. While this is not essential to the practice of the invention in its broadest aspects, the arrangement typified by FIGS. 7 and 8 is highly advantageous in that it requires but a single set of feeler pins P2–P5, P7 and a single set of sensing switches S2–S5, S7 controlled thereby. Moreever, it requires but a single set of relays R2–R5, R7 to control a single decoding matrix 95. This is possible because in the present instance all of the significant locations within the field of a plural-line code character exist at different levels, and at levels which correspond to those of significant locations in an illegible, in-line code character field.

The latching or unlatching of the latching relay LR in effect converts the apparatus and circuitry of FIGS. 7 and 8 from a single-line code reader to a plural-line code reader simply by changing the conditions of the contacts LR1–LR5. When operating as a single-line code reader, the five cam switches shown in FIGS. 7 and 8 have no effect at all, but when converted to operate as a plural-line code reader, these switches make certain that only certain levels within successive lines are sensed and that information contained within the successive lines of a plural-line code are stored until all have been sensed. Thus, the apparatus of FIG. 7 embodies a preferred arrangement for carrying out the present invention, and constitutes means for selectively reading perforated code lines one at a time or n lines at a time, n here being three. By the terminology "reading plural lines at a time," it is intended to embrace both the simultaneous reading of a plurality of lines or the rapid successive reading of a plurality of lines before a composite output response thereto is generated.

SECOND EMBODIMENT

Figure 9:
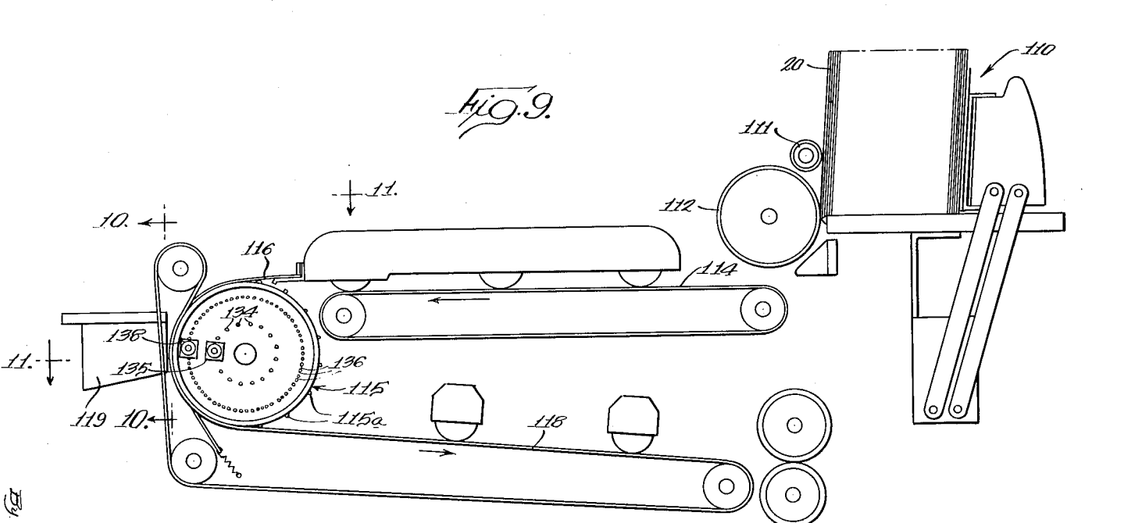
FIG. 9 is a diagrammatic illustration of a photoelectric type of dual code reader constructed in accordance with the invention.

FIGS. 9–14 illustrate a second embodiment of a dual code reader organized in accordance with the present invention, and in which indicia or perforations are sensed photoelectrically. Referring to FIG. 9, the apparatus includes a supply magazine 110 which receives a plurality of stacked documents, such as the check 20 of FIG. 1. These checks are fed one at a time from the magazine by a starting roller 111 and a feed roller 112 onto a continuously moving belt 114 which advances them toward a continuously rotating drum 115 having a plurality of circularly spaced, radially projecting teeth 115a. The feed holes 50 (FIG. 1) in each of the individual documents may be automatically alined with and engaged on the teeth 115a by means described and claimed in the above-identified copending Dreyer application. As each document or check is engaged with the teeth 115a on the drum 115 and carried by the latter through an arc, it is held firmly against the drum surface by means of a flexible, hold-down strap 116. As the document is advanced to the lower side of the drum 115, it is deposited on a second, continuously moving belt 118 and carried to a collecting hopper (not shown). The documents are fed lengthwise to the drum 115 so that the sprocket holes 50 in the left ends of documents (such as the check 20, FIG. 1) are first engaged with the teeth 115a.

As each check or document is held in curved conformity to the surface of the drum 115, the coded indicia or perforation lines thereon travel successively past a head 119 which contains a plurality of photoelectric sensing elements.

The drum 115 is mounted on a shaft 120 journaled in the machine frame (FIG. 11), and has the teeth 115a located near one axial edge so that the strip or area 20a (FIG. 1) of each document will project beyond the left edge of the drum and pass over an arcuate slot 121 defined between the left end of the drum and a stationary, arcuate guide member 122. The head 119 is stationarily mounted in registry with the slot 121, so that the perforation lines in each document will pass successively thereby. A light source in the form of a lamp 124 is disposed within the space partially enclosed by the drum 115 and the guide 122, so that the perforation lines in each document pass between the lamp and photoelectric sensing elements carried within the head 119.

The inner face 119a of the head 119 corresponds substantially to the area of a rectangular matrix which receives the plural-line coded indicia to represent one character. This inner face 119a is formed with openings (FIG. 10) communicating with the exposed, active ends of five photosensitive elements which are located in a pattern corresponding to the significant perforation locations (FIG. 2) of the plural-line code system. That is, there are exposed photoelectric elements PC6, PC8, PC10, PC15, PCc at stations 6, 8, 10, 15 and c which are located, respectively, at levels 2, 3, 4, 5, and 7. If a rectangular perforation field for a plural-line coded character in a document is placed in registry with the matrix field indicated in FIG. 10 on the face 119a of the head 119, then those particular photosensitive elements disposed at significant locations where perforations exist will receive light from the lamp 124 (FIG. 11) and will be correspondingly activated.

Figure 10:
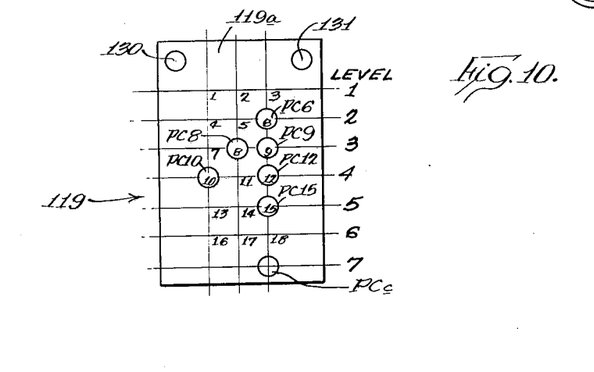
FIG. 10 is a detail elevation looking substatially along the line 10—10 in FIG. 9 and illustrating the location of photoelectric sensing elements in the head of the reader.
Figure 11:
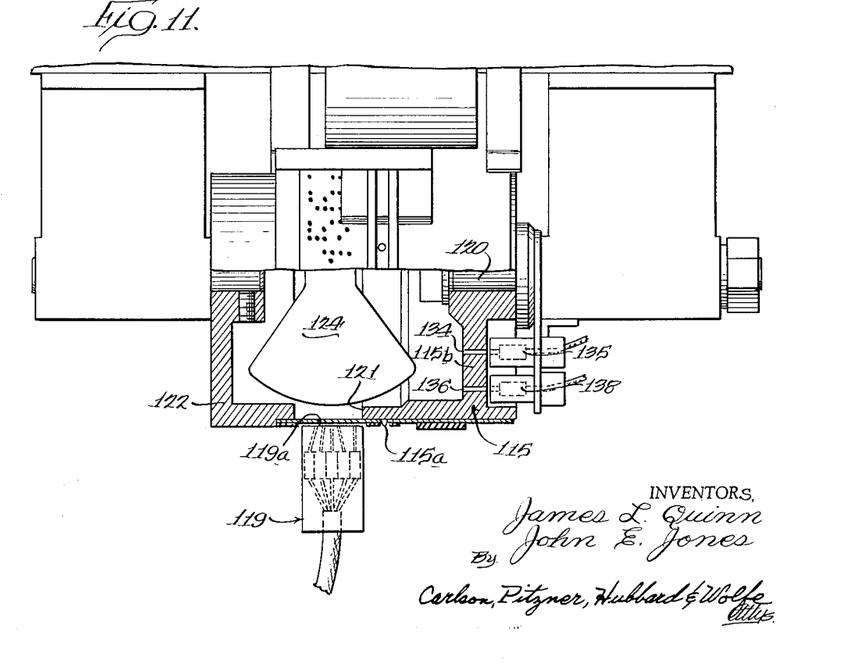
FIG. 11 is a sectional view, taken substantially along the line 11—11 in FIG. 9, showing details of the photoelectric head and associated parts.

For the purpose of making it possible to accurately read in-line coded characters, two additional photosensitive elements PC9, PC12 are located within the head 119 and disposed to have their active surfaces located at stations 9 and 12 within the rectangular matrix. These two photocells PC9, PC12 when considered in combination with photocells PC6, PC15 and PCc can thus sense the presence or absence of perforations within a single line at any of the levels 2, 3, 4, 5 or 7.

In addition to those photosensitive elements previously noted, the inner face 119a of the head 119 includes a document-sensing photocell 130 and an "end-of-document" photcell 131. These do not sense the presence or absence of perforations within the record medium, but are simply masked from the lamp 124 whenever a document is passing in front of the reading head.

In order to determine precisely those instants at which each perforation field is in registry with the photosensitive elements which are to detect the presence or absence of perforations at different stations, two synchronizing elements are employed. As here shown (FIGS. 9 and 11), the drum 115 is formed with a central flange 115b having a first circularly disposed array of holes 134 therein. These holes are located on a radius to pass successively in front of a first synchronizing photocell 135, the holes being spaced apart by angles equal to the angle subtended by the width of one plural-line character on a document held against the surface of the drum 115. Since each plural-line character occupies four successive lines (three perforation lines plus a space), and since the feed holes 50 in engaging the teeth 115a properly "phase" each character field relative to the holes 134, this arrangement results in the photocell 135 receiving light through one of the holes 134 from the lamp 124 each time that a plural-line rectangular perforation field is alined with the rectangular field (FIG 10) in which the photosensitive elements are disposed. Thus, if the status or condition (lighted or unlighted) of the photosensitive elements within the head 119 is determined at those instants when the synchronizing photocell 135 receives light, the combination of perforations in the significant locations of a plural-line code character will be sensed.

In one form, and in one mode of operation, the apparatus is to precisely read and respond to in-line code characters. In order to determine when each successive line of perforations in a document moving with the drum 115 is alined with the five vertically spaced photosensitive elements PC6, PC9, PC12, PC15, and PCc, a second circular array of holes 136 is formed in the flange 115b of the drum 115. There are four times as many holes 136 as there are holes 134, and the angular spacing between successive holes is one-quarter as great. Stationarily mounted to have the holes 136 pass successively thereby is a second synchronizing photosensitive element 138. Thus, this latter synchronizing element will receive light through one of the holes 136 at instants when succeeding perforation lines on a document are in registry with the five photocells shown in vertical alinement at the right of FIG. 10.

Figure 12:
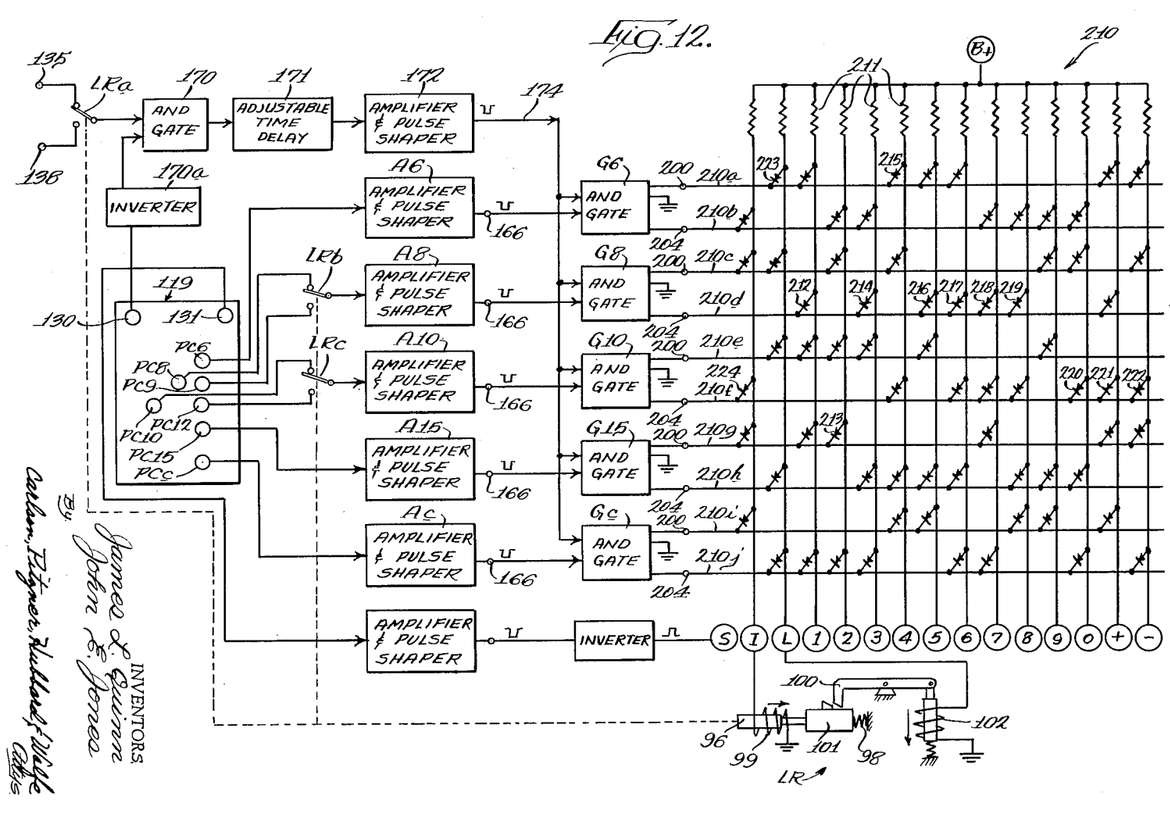
FIG. 12 is a diagrammatic block-and-line illustration of the electrical components associated with the reader of FIG. 11.

The several photocells within the head 119 are associated with electrical circuit components shown partially in block-and-line form and partially schematically in FIG. 12. This circuitry includes a latching relay LR which is substantially similar to that shown and described in connection with FIG. 8. It includes substantially the same components, and the same reference characters have been applied thereto. However, this latching relay controls three double-throw contacts here designated LRa, LRb and LRc. When the dual code reader is to respond to plural-line code characters, the relay LR will be unlatched, and the contacts LRa, LRb and LRc held in the positions illustrated in FIG. 12.

With the relay LR unlatched, the five photocells PC6, PC8, PC10, PC15 and PCc are respectively connected to five amplifiers and pulse shapers A6, A8, A10, A15, and Ac. Thus, as perforations at different levels within the perforation lines of a document or check 20 pass the respective photocells, the latter will receive light from the lamp 124 (FIG. 11) and will supply a response signal to the corresponding ones of the amplifiers and pulse shapers.

Figure 13:
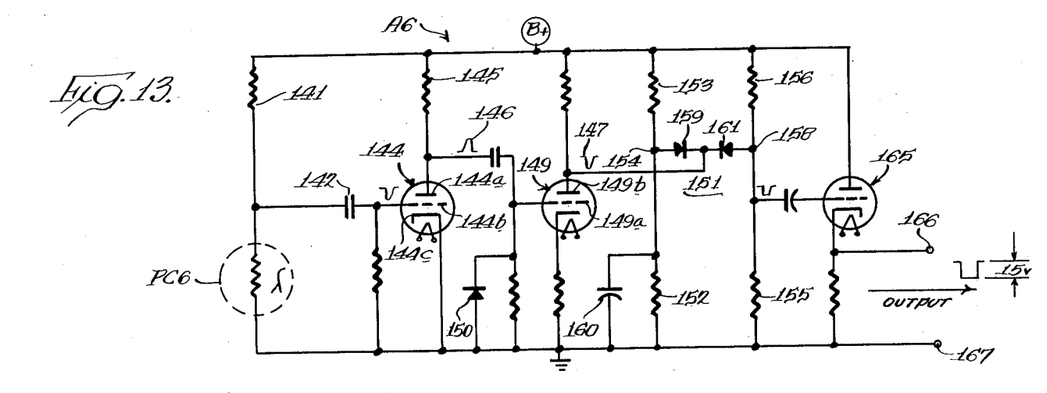
FIGS. 13 and 14 are detailed schematic wiring diagrams for certain components shown in FIG. 12.

A typical organization for one of these amplifiers, A6, is illustrated by FIG. 13 wherein the photosensitive element PC6 is of the variable resistance type comprising material such as lead sulfide, normally having relatively high resistance which decreases when the element is exposed to light. This resistance-varying photocell is connected as part of a potential dividing circuit across a direct voltage source here illustrated conventionally as having terminals at B+ and ground. The junction between the potential divider formed by the photosensitive element PC6 and a resistor 141 is connected through a coupling capacitor 142 to the control electrode 144b of a first amplifying discharge device or triode 144. The latter has its anode 144a connected through a load resistor 145 to the B+ terminal, and its cathode 144c connected directly to ground.

Each time the light falls momentarily upon the photosensitive element PC6, there will be a potential drop at the control electrode 144a, so that there will be a positive voltage pulse 146 appearing at the anode 144b. This positive voltage pulse is applied to the control electrode 149a of a second amplifying triode 149. The addition of a diode 150 prevents the control electrode 149a from swinging more negative than ground potential. The response to each positive voltage pulse 146 is a negative-going pulse 147 at the anode 149b of the triode 149. The output of the triode 149 is supplied to a clipping circuit represented collectively at 151. This includes a potential divider made up of resistors 152, 153 so proportioned that their junction 154 is normally held about 15 volts lower in potential than the steady-state voltage of the anode 149b. It further includes a second potential divider made up of resistors 155 and 156 so proportioned that the junction 158 therebetween is maintained at a potential which is a few volts less positive than the steady-state potential at the anode 149b. As the negative-going pulse 147 builds up, the potential at the junction 158 can only decrease about 15 volts until it equals the potential at junction 154, due to clipping action produced by current flow through a diode 159 and through a relatively large capacitor 160. Moreover, any noise or slight variations in the amplitude of the clipped voltage pulse are not transferred to the junction 158 because of clipping action afforded by a second diode 161. Thus, in response to each momentary light pulse falling on the photosensitive element PC6, a negative-going square wave voltage pulse of about 15 volts amplitude is created at the junction 158. This is amplified by a conventional cathode follower stage 165, and appears between output terminals 166 and 167, the latter being always at ground potential.

Negative-going square wave voltage pulses appear on the output terminals 166 of all of the amplifiers shown in FIG. 12 whenever their corresponding input photocells receive light through a perforation hole in a document passing the reading head 119.

It is desired, however, to sense the conditions of the photosensitive elements only when a plural-line code character field is in registry with the field represented by the face 119a of the reading head. For this synchronizing action, the photocell 135 is connected through the contacts LRa to one input of an "and" circuit or gate 170. The other input of that gate is connected through an inverter 170a to the document-presence sensing photocell 130. Thus only at those instants when a document is passing by the reading head (and covering the photocell 130) and when one of the holes 134 (FIG. 9) is in registry with the synchronizing photocell 135 will there be simultaneous input signals to the gate 170, and an output signal passed therefrom. This output signal is transferred to an adjustable time delay circuit 171 which may take any one of a variety of forms known to those skilled in the art. After the time delay created by the circuit 171, the response is passed to an amplifier and pulse shaper 172, and appears on a conductor 174 in the form of a negative-going square wave voltage pulse.

The conductor 174 leads to first input terminals of a plurality of "and" gates G6, G8, G10, G15, and Gc. The output terminals 166 of the amplifiers A6, A8, A10, A15 and Ac are connected to the second input terminals for the gates G6, G8, G10, G15 and Gc, respectively.

Figure 14:
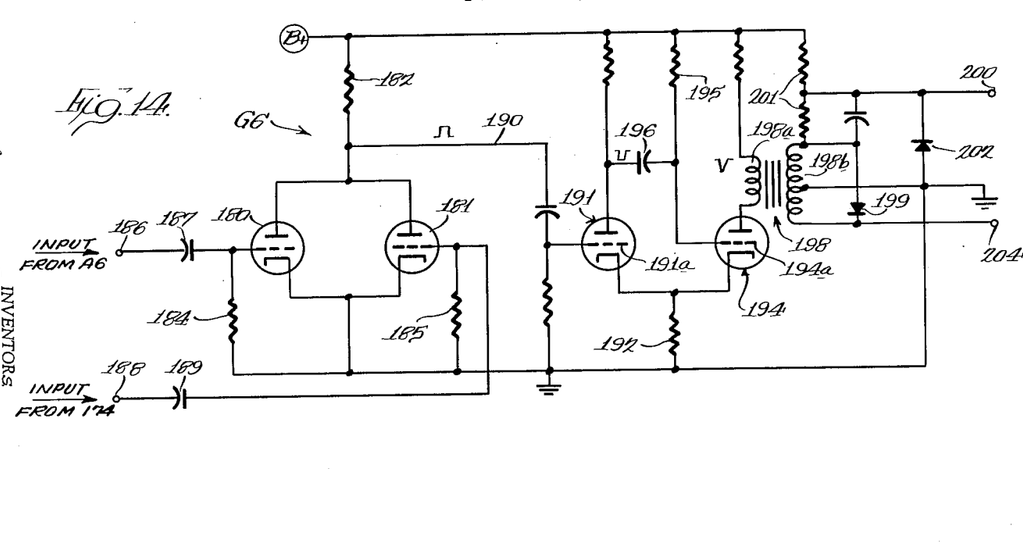

The details of a typical one of the gates, and here the gate G6, are shown by FIG. 14. Briefly stated, this gate comprises a pair of electron discharge devices or triodes 180, 181 having their anodes connected to a suitable B+ or positive voltage source through a common load resistor 182. Their cathodes are connected directly to ground. Biasing resistors 184 and 185 normally hold the control electrodes of these triodes at ground potential so that both normally conduct heavily. Even if one of the triodes 180, 181 should be driven to current cut-off, the potential at their anodes will not rise appreciably.

A first input terminal 186 (which receives the output of the amplifier A6) is coupled by a capacitor 187 to the control electrode of the triode 180, and a second input terminal 188 (receiving the voltage pulses appearing on the conductor 174, FIG. 12) is coupled by a capacitor 189 to the control electrode of the triode 181. If the negative-going pulses on the two input terminals coincide in time, then both of the triodes 180 and 181 will be simultaneously rendered non-conductive, and a positive-going voltage pulse will appear on a conductor 190 connected to their anodes.

This positive-going pulse is coupled to the control electrode 191a of a discharge tube 191 normally biased to cut-off by current flow through a cathode resistor 192 connected in circuit with a second triode 194 having its control electrode 194a normally held at a high potential by means of a resistor 195 connected to the B+ terminal. When the positive-going pulse is applied to the control electrode 190a, the triode 190 is rendered conductive. The potential drop at its anode is transferred through a coupling capacitor 196 to the control electrode 194a. This tends to reduce the current flow through the triode 194 by regenerative action, and causes an abrupt decrease in the current flow through the primary winding 198a of a pulse transformer 198 which is connected in series with the anode of the tube 194.

Thus, whenever the "and" circuit G6 responds to simultaneous negative-going signals on the input terminals 186 and 188, a negative-going voltage pulse is induced in the upper half of a center-tapped secondary winding 198b and a positive-going voltage pulse is induced in the lower half of that secondary winding, the center tap being held at ground potential. A diode 199 connected across the secondary winding 198b prevents "ringing" or oscillation following the output pulses. A first output terminal 200 is normally held at a positive potential (on the order of 25 volts) relative to ground by virtue of a voltage divider 201, and is prevented from swinging negative relative to ground by a clamping diode 202. A second output terminal 204 is normally held directly at ground potential, but swings positive relative to ground whenever an output signal occurs. Thus, the two output terminals 201 and 204 are normally at +25 and zero volts, respectively, relative to ground but swing to potentials on the order of zero volts and +25 volts whenever an output signal is produced by the gate.

Referring again to FIG. 12, each of the gates G6, G8, G10, G15 and Gc will provide an output signal on their paired output terminals whenever the corresponding photosensitive elements PC6, PC8, PC10, PC15 and PCc receive light through perforations in a coded character field at the instant that one plural-line field is in proper registry therewith as indicated by the response of the synchronizing photocell 135 and negative-going voltage pulses appearing on the conductor 174.

The output terminals of the five gates (FIG. 12) are connected directly to the ten input lines 210a—210j of a decoding diode matrix 210. This matrix includes fourteen output conductor terminals, each of which is connected to a suitable positive voltage source, here represented conventionally by the symbol B+, through current-limiting resistors 211. Each such output terminal is connected to different combinations of the ten input conductors by unidirectionally conductive devices or diodes. These diodes are poled to conduct current in a direction from each of the output terminals to different ones of the input conductors, and will conduct current when and only when the potential of the associated input line is less negative than the value of the B+ voltage, which may be on the order of 15 volts. The diodes in the matrix 210 are so arranged that one and only one of the output terminals can rise to a relatively high potential, substantially equal to that of the positive voltage source, when responses of the five controlling gates occur in different combinations.

For example, consider that the numerical character "9" is reresented in a plural-line code on a check 20, and is read by simultaneous response of photocells PC6 and PC15. Under these conditions, the gates G6 and G15 will simultaneously produce changing signals on their output terminals. The matrix input conductors 210a and 210g will thus be driven to zero volts potential and the input lines 210b and 210h driven to +25 volts potential. Since the remaining gates provide no response, input lines 210c, 210e and 210i will remain at about +25 volts, while input lines 210d, 210f, and 210j will remain at ground potential. Under these circumstances, current flows through the diode 212, thereby creating a potential drop across the associated current-limiting resistor 211, and holding the output terminal "1" near ground potential. Similarly, current flows through diodes 213—224, among others, to hold the output terminals 2–8, 0, +, —, L, and I near zero or ground potential. Only the output conductor for the character "9" presents no direct current flow path to ground through one of the diodes connected thereto. The output terminal for the character "9" is thus momentarily placed at a relatively high positive voltage, e.g., +15 volts. This high voltage constitutes an output signal representative of the character "9" which has been read from a plural-line code representation of that character on the check.

It will be apparent without further explanation how the diode matrix 210 functions to provide one and only one output signal on a given output terminal to correspond to any of several possible characters represented in plural line code and read or sensed by the photoelectric head 119.

Assume now that a plural-line code for the character "I" is read from the record medium. This results in a positive voltage appearing on the output terminal "I" of the decoding matrix 210. The latching coil 99 is momentarily energized. Accordingly, the armature 96 (FIG. 12) is shifted to the right and latched in that position by the finger 100. The latching relay contacts LRa, LRb and LRc are now changed to the opposite contact points.

As a first result, the synchronizing photocell 138 is connected to the input of the "and" gate 170 in lieu of the synchronizing element 135. Secondly, the contacts LRb and LRc connect the photosensive elements PC9 and PC12 to the amplifiers A8 and A10 in lieu of the elements PC8 and PC10.

The synchronizing photocell 138 will supply an output response at those instants when each succeeding line of perforations is in registry with the five vertically alined photocells PC6, PC9, PC12, PC15, and PCc. These latter photocells will sense the presence or absence of perforations at the five significant levels or locations in each line of perforations, and supply output responses in accordance with the in-line code of FIG. 5. Each time that a row of perforations passes the five alined photocells, those ones which sense perforations in that line will provide input signals to the respective amplifiers A6, A8, A10, A15 or Ac; these amplifiers will in turn supply input signals to appropriate ones of the five gates G6, G8, G10, G15 and Gc. Those ones of the gates which receive such input signals will provide output responses at the time that a synchronizing signal appears on the conductor 174 (FIG. 12). Thus, the ten input lines 210a–210j of the decoding matrix 210 will be momentarily placed at potentials which cause a particular one of the output terminals, corresponding to the in-line code character read, to be placed at a positive voltage, e.g. +15 volts.

Simply by way of example, assume that the in-line code character "5" is sensed from the document. This code line will have perforations at levels 3 and 5 (FIG. 5) and will, therefore, result in light activating photocells PC9 and PC15. Accordingly, at the time that the synchronizing photocell 138 creates a synchronizing voltage pulse on the conductor 174, only the amplifiers A8 and A15 will be supplying input pulses to the gates G8 and G15. Recalling that the gate output terminals 200 and 204 are normally held at +25 and zero volts, respectively, these potentials will be "switched" on the output terminals of the gates G8 and G15. Therefore, the matrix input conductors 210c and 210g will be placed at zero volts, while the conductors 210d and 210h will be driven to about +25 volts. The remaining input conductors 210a, 210e, 210i and 210b, 210f, 210 j will remain at +25 volts and zero volts, respectively.

Inspection of the diode matrix 210 will reveal that when the ten input conductors are placed at such potentials, current flow paths are established through diodes from all of the diode matrix output lines except that which corresponds to the character "5." Therefore, current flows through all of the current-limiting resistors 211 except that one associated with the output terminal "5," holding all output terminals except that corresponding to the character "5" at or near zero volts potential.

In this manner, proper output responses are provided on the terminals of the diode matrix 210 for each single line of perforations read from the document or record medium.

If, at any time, an in-line code character "L" is sensed, then the output terminal "L" will be raised momentarily from zero volts to about +15 volts. Current flows through the unlatching coil 102, so that the latching relay LR and its contacts LRa, LRb, LRc are restored to the unlatched condition. The apparatus and circuitry will thus be reconditioned to read and properly respond to plural-line, legible code characters.

Whenever no document is passing in front of the reading head 119, then all of the photocells therein will receive light, and one of the synchronizing photocells 135 or 138 will periodically receive light. However, this is not objectionable since even if all of the gates G6, G8, G10, G15, and Gc (FIG. 12) should simultaneously produce output signals, the diode matrix 210 cannot produce an output signal on any of its output terminals.

As the end of each document clears the "end-of-document" photocell 131, the latter will receive light and supply an input response to an associated amplifier 131a. The latter is connected through an inverter 131b to a "space" output terminal s, producing a positive voltage on the latter. This may signify that one complete document has been read, and that succeeding output signals from the matrix 210 correspond to information on the next document.

In review, the apparatus of FIGS. 9-12 operates in one mode to read a plurality of n lines simultaneously, the number n of lines in each code character here being three. When so operating, the photocell PC10 is effective to sense the presence or absence of a perforation in the significant matrix location which is at the fourth level of the first matrix line. Photocell PC8 operates to sense the presence or absence of a perforation in the third level or significant location of the second line within the matrix. Finally, the photocells PC6, PC15 and PCc operate to sense the presence or absence of perforations in levels 2, 5 and 7, within the third line of a plural-line code field. Thus, the system reads "three lines at a time."

On the other hand, when the latching relay LR is in its latched state, the two photocells PC8 and PC10 are replaced by the photocells PC9, PC12 which, together with the photocells PC6, PC15 and PCc, are disposed in a single line and at the significant locations or levels of the in-line code. Moreover, the synchronizing photocell 138, which lies opposite the holes 136 (FIG. 9) in the drum 115 is connected to supply signals to the conductor 174 (FIG. 12), as each successive line of perforations is placed in registry with the five effective photocells. As a result, the apparatus is conditioned to read one line at a time and to respond properly to characters represented by the in-line code of FIGS. 4 and 5.

Because the legible, plural-line code (FIG. 3) and the illegible, in-line code (FIG. 5) by which characters are represented on the check 20 (FIG. 1) have significant locations at the same levels, it is possible to utilize a portion of the sensing elements in both reading means. In other words, the photocells PC6, PC15 and PCc (FIG. 12) are common to the two reading means 38 and 39 represented in block form by FIG. 6. Moreover, in the arrangement of FIG. 12, the latching relay LR constitutes the enabling and disabling means 42, 44 and 48, 49 shown diagrammatically in FIG. 6. And because of the coding systems employed, the single diode matrix 210 performs the functions of both the first decoder 40 and the second decoder 41 in FIG. 6. Thus, FIGS. 9-12 represent a preferred embodiment of the invention which is especially advantageous in that many of the structural and electrical components are caused to serve as two separate means to provide two separate functions.

The present invention makes it possible to mechanically or electrically "read" different characters which are represented in either or both of two codes on a record medium such as the check 20 shown in FIG. 1. A good portion of the characters represented on the record medium are compactly represented by single-line code representation. A greater number of characters can thus be applied within a given space on the record medium. However, those particular characters which are important enough to require visual checking from time to time can be represented in a plural-line code which may show each such character in legible form. The record medium and the reading means here disclosed thus make possible automated reading of both legible and illegible characters represented by two different codes.

We claim as our invention:

1. Apparatus for automatically reading characters represented by indicia on a record medium in either or both of first and second codes, said apparatus comprising first reading means responsive to characters in the first code, second reading means responsive to characters in the second code, said first and second reading means including indicia sensing means, means for advancing indicia for successive characters on a record device relatively past said sensing means, means responsive to a first prefix character indicative that the following characters are in the first code for respectively enabling and disabling said first and second reading means, and means responsive to a second prefix character indicative that the following characters are in the second code for respectively disabling and enabling said first and second reading means.

2. Apparatus for automatically reading characters represented by successively spaced sets of indicia on a record medium in either or both a plural-line code system or an in-line code system, said apparatus comprising, in combination, first reading means for sensing and uniquely responding to each character represented in the plural-line code system, second reading means for sensing and uniquely responding to each character represented in the in-line code system, a single set of output terminals including one for each character to be represented, means interconnected between said first and second reading means and said output terminals for supplying a signal to any particular terminal corresponding to a character read by either reading means, and means for automatically disabling said second or said first reading means and enabling said first or said second reading means when the following characters on the record medium are in said plural-line or in-line code systems, respectively, so that the response at said output terminals is the same regardless of which code system represents any character.

3. Apparatus for reading characters represented by indicia on a record medium in either or both a plural-line binary code or an in-line binary code, a group of characters in either code being preceded by a code-signifying prefix character, said apparatus comprising, in combination, first means for reading the indicia in a plurality of lines and supplying output signals corresponding to characters represented in said plural-line code, second means for reading the indicia in one line at a time and supplying output signals corresponding to characters represented in said in-line code, and means for selectively rendering one or the other of said two reading means effective in response to reading by either one of a prefix character signifying that the following characters on the medium are in the code acceptable to the other.

4. The combination set forth in claim 3 wherein characters represented in said plural-line code on said medium have $m$ significant indicia locations each at a different level lengthwise of the lines, and characters represented in said in-line code have $m$ significant indicia positions located lengthwise of the single line, and further characterized by the fact that said second reading means comprises $m$ sensing means to sense the presence or absence of indicia in significant positions of a single line, and said first reading means comprises at least a part of said $m$ sensing means to sense the presence or absence of indicia in significant positions of a plural-line code character.

5. Apparatus for reading characters represented by indicia on a record medium in either or both a plural-line binary code of $n$ lines which makes each character visibly legible or a single-line binary code which makes each character visibly illegible, a group of characters in either code being preceded by one of two code-signifying prefix characters, said apparatus comprising, in combination, first means for reading $n$ lines, second means for reading one line at a time, a single decoding means, and means responsive to reading by said first or second reading means of prefix characters signifying that following characters are in in-line or plural-line codes for operatively associating said second or first reading means with said decoding means to make the response of said decoding means the same for a given character on said medium whether that character is represented by plural-line or in-line code.

6. The combination set forth in claim 5 further characterized in that said first and second reading means each include a plurality of indicia-sensing devices, at least a part of said sensing devices being common to both said first and second reading means.

7. In apparatus for reading characters represented by indicia on a record medium in either or both of two codes, the first code being a plural-line code of $n$ lines with at least one significant indicia position in each line, the second code being a single-line code with $m$ significant indicia positions in each line, each group of characters in either code being preceded on said medium by a corresponding one of two code-signifying prefix characters, said apparatus comprising, in combination, a plurality of $m$ means for sensing indicia arranged in a single-line, means for feeding the indicia lines on said medium successively into registry with said sensing means, selectively operable means for decoding the cumulative response of said sensing means resulting from sensing $n$ lines, selectively operable means for decoding the output of said sensing means resulting from sensing a single line at a time, and means responsive to the output of said decoding means corresponding to a prefix character signifying plural-line or in-line code for respectively rendering operable said cumulative decoding means or said single-line decoding means.

8. In apparatus for reading characters represented on a record medium by either of two binary codes, the first code being a legible perforation code with each character represented by different combination of holes punched in a rectangular matrix $n$ lines wide and with $m$ significant positions with each at a different level and at least one in each line, the second code being an illegible in-line perforation code with $m$ significant positions at different levels in a single-line, the combination comprising $m$ sensing means arranged in a row, means for bringing each code line successively into registry with said sensing means, decoding means, and means for selectively connecting said sensing means to said decoding means so that the latter produces a decoded output signal for each in-line code line on said medium, means for selectively connecting said sensing means to said decoding means so that the latter produces a decoded output signal for $m$ lines of a plural-line code character on said medium, said last means including means for disabling those ones of said $m$ sensing means which do not correspond to the level of a significant location of each line in a plural-line code character as respective lines thereof are sensed.

9. Apparatus for reading characters represented by indicia on a record medium in either or both of first and second binary codes, the first code being a plural-line code of $n$ lines with at least one significant indicia position in each line, the second code being a single-line code with $m$ significant indicia positions at different levels in each line, each significant position in said two-dimensional code being on a level with one of said $m$ positions in said in-line code, said apparatus comprising, in combination, a number $m$ of sensing means disposed in a line to respectively sense the presence or absence of indicia in each significant position of an in-line code line, means for relatively feeding the record medium and said sensing means to bring the latter into registry with each code line, a number $m$ of bi-state devices operatively connected respectively to said sensing means and momentarily set to one state whenever the associated sensing means senses an indicia in a code line, decoding means responsive to the states of said bi-state devices for producing an output signal corresponding to the in-line code character sensed by said sensing means, and selectively operable means for retaining set those of said bi-state devices which are set to said one state during passage of $n$ code lines past said sensing means and for disabling said decoding means until $n$ code lines have been sensed, so that the output of said decoding means corresponds to a character represented in said plural-line code.

10. In apparatus for reading characters represented on a record medium by indicia applied in either first or second binary codes, said first code being a plural-line code with a plurality of significant indicia locations in a rectangular field, said second code being an in-line code with a plurality of significant indicia locations in each line, said apparatus comprising, in combination, a plurality of sensing means arranged in a rectangular field with a first group thereof spaced correspondingly to the significant locations in said plural-line code and a second group thereof spaced in a line correspondingly with the significant locations in said in-line code, means for feeding the indicia lines on the record medium past said sensing means, means for normally disabling all of said sensing means, means for selectively enabling said first group of sensing means at instants when a plural-line code field is in registry with the sensing means field, means for selectively enabling said second group of sensing means when each code line is in registry therewith, and means for selectively decoding the response of said first and second groups of sensing means.

11. The combination set forth in claim 10 further characterized in that at least a part of the sensing means in said first group are common to those in the said second group.

12. In apparatus for reading characters represented on a record medium by indicia in either first or second binary position codes, said first code being a plural-line code with a plurality of significant locations in a rectangular field, said second code being an in-line code with a plurality of significant indicia locations in each line, said apparatus comprising, in combination, a first group of sensing elements arranged in a field corresponding to the significant locations of said plural-line code, a second group of sensing elements arranged in a line and corresponding to the significant locations of said in-line code, means for relatively sweeping the indicia lines on the record medium past said first and second group of sensing elements, a decoder, means for selectively connecting said first or said second group of sensing elements to said decoder, means for normally preventing said decoder from responding to said sensing elements, and means for selectively enabling said decoder at instants when each plural-line code field is in registry with said first group of sensing elements or at instants when each in-line code line is in registry with said second group of sensing elements.

13. In apparatus for reading characters represented on a record medium by indicia applied in either first or second binary codes, the first code being a plural-line legible code with indicia stations in a rectangular matrix and with a plurality of significant locations in said matrix, the second code being an in-line code with a plurality of significant locations in each line, the combination comprising first means for sensing the presence or absence of indicia in the significant locations of each plural-line code matrix, second means for sensing the presence or absence of indicia in the significant locations of each line, first selectively operable means for decoding the response of said first sensing means each time the record medium is advanced a distance equal to the space occupied by one plural-line code matrix, second selectively operable means for decoding the response of said second sensing means each time the record medium is advanced a distance equal to the width of one line, and means for complementally rendering said first and second means operable when plural-line or in-line code characters are to be read.

References Cited in the file of this patent
UNITED STATES PATENTS

| | | |
|---|---|---|
| 2,294,679 | Maul | Sept. 1, 1942 |
| 2,614,632 | Clos | Oct. 21, 1952 |
| 2,692,083 | Marsh | Oct. 19, 1954 |
| 2,731,200 | Koelsch | Jan. 17, 1956 |
| 2,858,073 | Taube | Oct. 28, 1958 |